July 23, 1968
E. J. KELLY
3,393,943
APPARATUS AND METHODS FOR FLUIDIZING
GRANULAR OR PULVERATE MATERIALS
Filed June 29, 1966
2 Sheets-Sheet 2
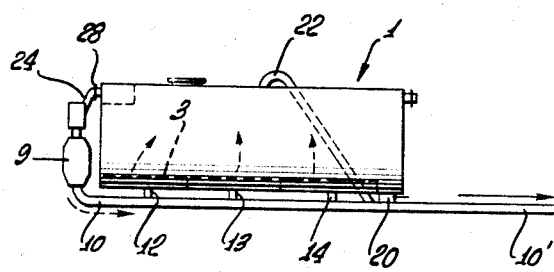
FIG. 3.
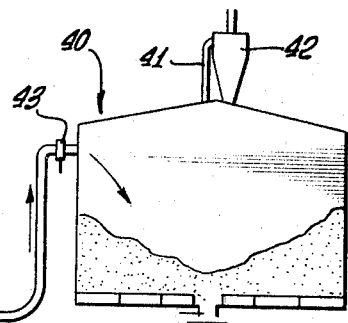
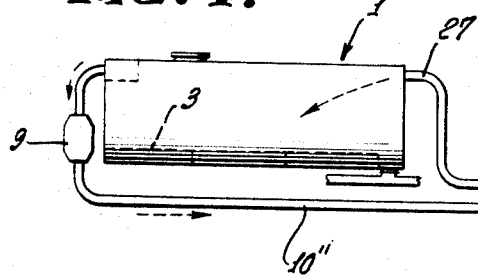
FIG. 4.
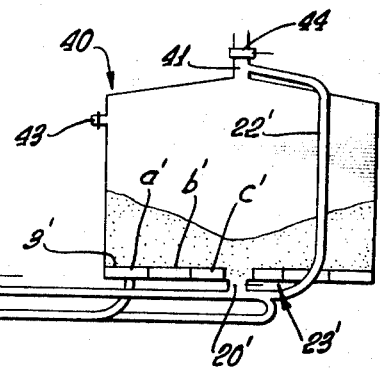
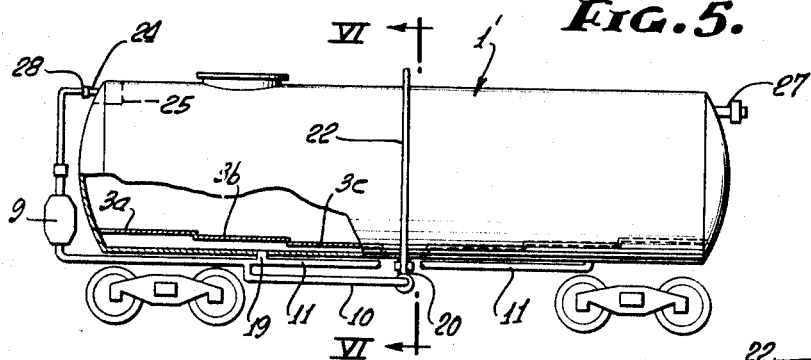
FIG. 5.
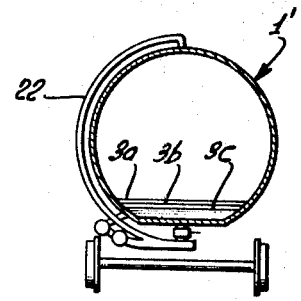
FIG. 6.
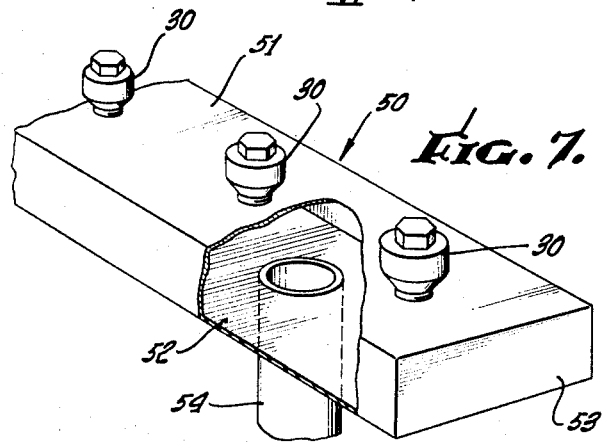
FIG. 7.
INVENTOR.
EDGAR J. KELLY
By
Miketta, Glenny, Poms & Smith
ATTORNEYS.

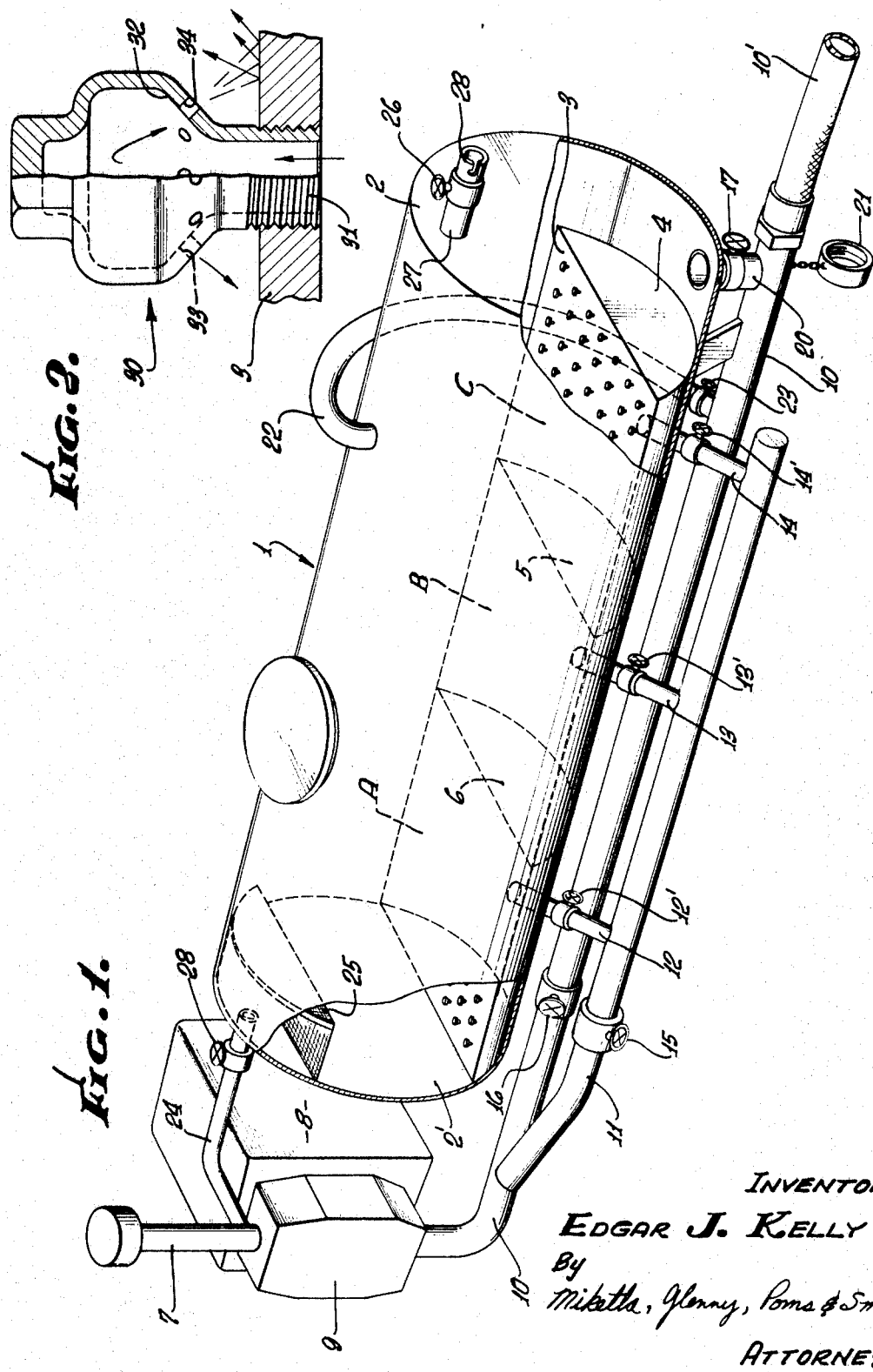

3,393,943
APPARATUS AND METHODS FOR FLUIDIZING
GRANULAR OR PULVERATE MATERIALS
Edgar J. Kelly, Lake Zurich, Ill., assignor to American Colloid Company, Skokie, Ill., a corporation of Delaware
Filed June 29, 1966, Ser. No. 561,527
11 Claims. (Cl. 302—53)

ABSTRACT OF THE DISCLOSURE

A self-evacuating housing (e.g. a transport vehicle) for granular material, which includes a material supporting floor section, a material supply inlet into a top portion of the housing, a material discharge outlet from the bottom portion of the housing, an air supply chamber beneath at least a portion of the floor section, and air distribution means carried by the floor above the air supply chamber for discharging air at a greater volumetric rate into the housing at zones distant from the material discharge outlet than in zones closer to said outlet, whereby granular material contained in said housing is horizontally discharged from the material discharge outlet.

---

This invention pertains to new constructions of transport vehicles and methods and devices for use in the ready transport, storage, and movement of various granular or powdered materials.

The usual manner of shipping dry, granular or pulverulent materials is in bags, each of which must be individually filled, handled, shipped, stored, opened, etc. Although shipment of such materials in bulk (such as boxcars or in large containers or trucks) has been tried, the means and methods used heretofore were not effective since the potential volume of the container has not been utilized and an excessive amount of auxiliary equipment was needed to fill and discharge the transport container so that its contents were delivered to bins or storage facilities on the user's premises.

The present invention is directed to novel and economical means, methods and constructions adapted to handle granular materials (this term, as used herein including any organic or inorganic material of pulverulent, powdered, granular, fibrous or particulate form of uniform or graded particle size) in an efficient and economical manner into and out of supply, transportation or storage housings or enclosures, without the use of excessive amounts of auxiliary equipment and without segregation of the material by particle size, thereby insuring the delivery of a uniform and homogeneous material to its destination.

Moreover, the present invention relates to a construction and arrangement of elements whereby substantially the entire volumetric capacity of the containers or housings is utilized for storage or transportation. In other words, the entire volume encompassed by rectilinear or cylindrical overall parameters of the vehicle storage or transport may be utilized for the granular material, whereas from 25% to 40% of such potential capacity has heretofore been lost due to the prevalent view that steeply inclined sides and hopper-like bottoms were necessary to insure the flow of material to a discharge opening. (See for example, Patents 2,694,496, 2,915,314, and 3,152,842.)

Most prior transportation cars had to be filled from a plurality of overhead hatches by gravity, this necessitated careful positioning of a railroad car beneath supply chutes and a plurality of filling steps, whereas the system herein disclosed does not require such positioning and is not dependent upon gravity filling. Moreover, in its preferred form, the present mode of operation and system is not dependent upon the use of auxiliary compressors, components and conveying systems supplied by the recipient of the material. In its preferred form, the apparatus of the present invention carries its own compressor or blower and pneumatically conveys material from the transport vehicle to a storage bin or other area on the purchaser's or consumer's property and is also capable of picking up and placing within the transport vehicle any material which a mill or other source of granular or pulverulent material desires to ship by means of the transport vehicle.

The present invention teaches a novel mode of operation or method of causing a body of granular material to move or flow in a substantially horizontal direction while in a transport vehicle or storage chamber toward a material outlet from such vehicle or storage, without reliance upon the provision of inclined sides or floor, whereas in the prior art, sides and floors at greater than the natural angle of repose were deemed necessary in order to move granular or pulverulent material from a zone laterally removed from a material discharge outlet.

Although many prior transport vehicles for the bulk movement of granular materials depended upon mechanical tilting of the entire storage container in order to dump its contents through a material outlet, in some instances the combined use of inclined hopper bottoms and fluidization of the contents has been employed in an attempt to facilitate discharge of the material from a bulk transport. The so-called porous air-pads of wire cloth or finely porous ceramics which have been used heretofore on steeply sloping sides or bottoms of hoppers, were not entirely successful because they did not permit the flow of air at predetermined velocities and volumes. When an air pad of finely woven wire cloth is in position on a steeply inclined side of a hopper and the hopper is full of granular material, air will pass through substantially all portions of the pad; when, however, the pad is only half covered by a granular material, it will be found that most of the air will pass through the upper portion of the pad and does not exert a fluidizing action upon the remaining material. It is for this reason that most prior art transport vehicles depended upon steeply inclined sides to move the material toward a material discharge outlet; fluidization played a very insignificant role in such movement. The steep sides, hopper bottoms and compartmentation resulted in inefficient use of total available space.

The present invention provides means and a method of operation whereby air at predetermined and controlled rates of flow is injected into granular material supported upon a virtually horizontal floor, the air being injected at higher volumetric rates in zones at a greater distance from the material discharge outlet than in zones closer to the outlet; in this manner, the material is fluidized and, in addition, moved laterally toward the material discharge outlet. Furthermore, air sweeping above the body of material assists in evacuating a transport housing and may also be used in transporting the discharged material to storage at a point quite distant from the transport vehicle.

The preferred construction described hereinafter in greater detail also employs air distributing means of novel character which insure the most effective and controlled discharge of air at predetermined rates of flow and velocity into the material, the volume and velocity being sufficient to actually move the material in addition to fluidizing it.

An object of the present invention therefore is to disclose and provide means and methods whereby various granular materials (as herein defined) may be effectively and economically transported and the transport vehicles or housings filled and discharged rapidly and efficiently.

Another object of the invention is to disclose and provide a self-contained, self-filling and self-evacuating housing or transport vehicle.

Another object is to disclose and provide a storage or transport housing equipped to receive, hold and discharge granular materials in an effective manner, the volumetric parameter of such housing being utilized to a high degree for the reception of material.

Again, an object of the invention is to disclose and provide modes of operation, conditions insuring effective operation and preferred elements of construction relating to the storage and transportation of granular materials.

These and other objects and advantages of the invention will become apparent to those skilled in the art from the following description. Reference will be had to the appended drawings in order to facilitate understanding.

In the drawings:

FIG. 1 is an isometric diagrammatic representation of one form of storage housing, which may be employed either for storage or as transport vehicle;

FIG. 2 is a side elevation of a preferred air distributing means (partly in section) showing a typical nozzle arrangement, said air distributing means being capable of utilization in any of the forms of the present invention;

FIG. 3 is a diagrammatic representation of a transport vehicle and a storage container, this arrangement illustrating material flow from the vehicle to storage;

FIG. 4 is a diagrammatic representation of a transport vehicle utilizing the present invention and a storage housing also employing the present invention, the flow of material being from storage to the vehicle;

FIG. 5 is a side elevation, partly broken away, of another form of transport vehicle housing utilizing the invention;

FIG. 6 is a transverse section taken along plane VI—VI in FIG. 5;

FIG. 7 is a perspective view of an end portion of an elongated fluidizing element embodying a preferred air distributing means, a portion of the wall thereof being broken away.

FIG. 1 is an isometric view, somewhat diagrammatic, illustrating one form of pneumatic system embodying the present invention. As there shown, the housing 1 is preferably a horizontally disposed cylinder having ends 2 and 2'. Horizontally disposed cylinders are preferred since they are readily manufactured, although rectangular, box-like, horizontally extending housings may also be used. A planar, virtually horizontal floor 3 extends from the end 2' along the lower portion of the housing 1 to a point in proximity to the opposite end 2 of the housing, thereby forming a chamber of segmental section in the lower portion of the housing, the height of such segmental chamber being not more than 0.25 of the diameter of the housing and preferably only 0.15–0.2 of such diameter. In the simplest form of the device of the present invention, the end of this chamber is closed by a partition 4 spaced somewhat from the end 2 of the housing, thereby leaving a material discharge zone in the bottom of the housing adjacent end 2.

The chamber beneath the floor 3 may be a single chamber from end 2' to the partition 4 or it may be subdivided by transverse partitions into a plurality of subchambers; in FIG. 1, transverse partitions 5 and 6 subdivide the chamber into three subchambers, chamber C existing between end partition 4 and partition 5, chamber B between partitions 5 and 6 and the chamber A between the partitions 6 and end 2'.

It is to be understood that in the event the housing 1 and the apparatus of this invention are to be employed for the transportation of granular materials, the housing 1 is mounted upon a suitable framework which is part of a truck, trailer or railroad car. The drawings do not include the various longerons, stiffeners, cradle pieces, trucks and other appurtenances which would be employed in a vehicle body, such as a railroad car, since these details are not a part of the present invention. However, when the housing and vehicle is to be used as a transport vehicle, it is desirable that such vehicle carry a low pressure, high volume blower indicated at 9 with its own individual motor drive 8. A normal air intake with an air filter is indicated at 7, this air intake supplying the blower 9 whereas the compressed air discharged by the blower is discharged into an air line indicated at 10. Such air line may branch into a manifold 11 which is connected to the chamber beneath the floor 3, either directly (when the chamber is unitary) or by means of lines such as 12, 13 and 14 to each of the subchambers A, B, C beneath the floor 3. Each of the branch lines 12, 13 and 14 is preferably provided with its own control valve 12', 13' and 14'; the volume of air sent into line 11 and that sent along conduit 10 may be proportioned as desired by means of valves 15 and 16.

It will be noticed that line 10 (which is supplied with pressure air from the blower 9) extends beneath the housing 1 and a material discharge outlet line 20 provided with a quick acting valve 17 communicates the material discharge zone within housing 1 adjacent the end 2 with the line 10. The end of line 10 may be provided with an easily removable end cover 21 which, upon being removed, exposes a coupling means adapted to receive and hold a flexible conduit indicated at 10' whereby the material may be conveyed to a delivery zone, storage bin, silo or the like.

It is to be understood that the floor 3 supports a body of granular material which has been transported or which is stored in housing 1 and such floor includes air distributing means whereby air from the chamber beneath the floor can be used to fluidize the material and cause it to move horizontally toward the material discharge zone and material discharge outlet 20. Although the floor 3 may be perforated (or otherwise rendered air permeable to provide suitable air distributing ports), a preferred form of air distributing means is shown in FIG. 2 and will be described later.

The housing 1 is preferably provided with a fluidizing air outlet from the top of the housing, such air outlet port being in communication with conduit 22 having a control valve 23 and discharging into conduit 10 at an angle and in the direction of flow of air through such conduit.

The upper portion of end 2' of housing 1 is also provided with an air outlet conduit 24 provided with a valve 28, this line 24 communicating the interior of the housing with the air intake of the compressor or blower 9. Within the housing 1 and for the purpose of preventing dust from entering the blower, a gas permeable filter 25 is provided, said filter separating the conduit from dust in the housing.

The upper portion of the opposite end 2 of the housing 1 is provided with a material inlet or loading conduit 27 provided with a quick acting valve 26 and an end portion 28 adapted to be coupled to a flexible conduit.

As previously indicated, the floor 3 is provided with a plurality or multiplicity of spaced air distribution ports, but preferably carries air distribution means of the character illustrated in FIG. 2. As there shown, the floor 3 is preferably provided with a multiplicity of ports which are internally threaded, each being adapted to receive and hold a hollow, upstanding air distribution means 30. It will be noted that the lower end is externally threaded as at 31, while the upper end is closed and of polygonal external contour to facilitate screwing or unscrewing of these distribution means into the ports in the floor. Each of the elements 30 includes an enlarged upper chamber (in communication with the chamber beneath the floor through the open lower end of the element). Each distribution means thereby includes an upwardly and outwardly inclined conical surface 32, this surface being provided with a plurality of circumferentially spaced, downwardly directed jet ports or nozzles 33, 34 and the like. Since the diameter of the ports 33, 34, etc. is predetermined, the rate at which air is supplied for fluidizing the material can be carefully controlled. Moreover, as indicated by dash lines, air jets from these downwardly directed orifices impinge the upper surface of the floor and bounce the material upwardly, this jetting action preventing the granular material from compacting on the floor and very effectively distributing the air throughout the entire body of material.

Irrespective of the type of air distributing means employed, this invention contemplates the injection of air into the material carried by the floor 3 at a progressively greater volumetric rate of flow in areas further removed from the discharge port 20 than in floor areas closer to such discharge port. All of the air distribution means may be provided with jet openings of the same size but the volume of air supplied to the subchambers A, B and C beneath floor sections may be controlled by adjusting the valves 12', 13' and 14' so as to insure the delivery of air at progressively increasing rates from the floor area adjacent the material discharge conduit 20 to the furthest removed area A (adjacent end 2'). For example, air should be supplied through the floor above section A at a greater volumetric rate than to the material on floor section above subchamber B. Such regulation can be accomplished in various manners. For example, assuming that the floor sections above the subchambers are of equal area, and each area is provided with an equal number of air distribution means, the jet ports 33, 34, etc. of distribution means in the floor area furthest removed from the material discharge pipe 20 may be of larger diameter than those on the intermediate floor section and the jet diameters of the air distribution means 30 in the area adjacent the material discharge zone may be even smaller. Such arrangement may be used when a single chamber underlies the entire floor area. This number of air distribution means per square foot of floor may be varied (the size of jet diameters being uniform) and thereby attain the effect of the invention.

When the housing 1, mounted upon a railroad car and filled with granular material, reaches its destination adjacent a customer's plant, all of the valves referred to in connection with FIG. 1 are presumably closed. To unload the car and to transport the granular material contained therein into storage (illustrated diagrammatically in FIG. 3), the end of low pressure conduit 10 is uncovered and a flexible material conduit 10' is attached thereto, the other end of such conduit being connected to the upper portion of a storage silo or housing which may be a greatly enlarged version of the arrangement shown in FIG. 1. In FIG. 4, the flexible conduit 10' is shown connected to a valved inlet 83 to the upper portion of a large cylindrical storage tank 40. The top of the storage tank 40 is provided with an air outlet 41 leading to a dust collector 42, the dust there gathered discharging back into the storage. Assuming that all of the air distribution means are provided with the same size jet orifices and the chamber beneath the floor 3 is divided into three subchambers, the blower 9 is started and valve 15 is opened so as to supply air to the conduits 12, 13 and 14. Valve 12' is fully opened, valve 13' may be three-fourths opened and valve 14 may be opened only one-half. Valve 23 is also opened so that as the material becomes fluidized within the housing and excess air from above the material is discharged through conduit 22 and through the open valve 23 into conduit 10. Material discharge valve 17 is now gradually opened so as to let the material fall into the conduit 10 and be transported through 10' by the air from the top portion of housing 1. Valves 15 and 16 may be modulated to allow a proportion of air to pass directly into conduit 10.

Inasmuch as air at a much greater rate of volumetric flow passes into the far end of the housing than at areas closer to the material discharge zone, the fluidized material moves in a generally horizontal manner toward the material discharge outlet and it is unnecessary to tilt or raise the vehicle body in order to remove substantially all granular material from the entire housing and convey it a distance of 100 to 300 feet to storage. It may be noted that whatever "fines" may be suspended in the air above the body of material are recombined with the material discharged through 20 and 10'.

It is to be understood that although reference has been made to three floor sections (above chambers A, B, C) in the example, the floor may be divided into any desired number of sections, a larger number being employed when longer housings are used. The progressively higher rates of flow from the material discharge zone to the zone or zones furthest removed therefrom may be incremental. The air distribution means (or fluidizing ports) may be varied from the preferred means exemplified by FIG. 2 and may comprise the pores or openings in porous plates, foraminous laminates, screens, etc. The preferred form has unusual advantages; it may be part of a strong load-resistant floor, it distributes air effectively and agitates the material (each having its own plenum 35), resists wear and abrasion, may be readily replaced, and does not interfere with sweeping or cleaning of the floor.

It is of interest to note that the entire operation may be carried out at very low pressures, the pressure within the upper part of the housing 1 rarely exceeding 5–10 p.s.i. When the granular material being handled has a bulk density of, say, 55 pounds per cubic foot and is relatively finely divided (for example 90% passing a 200 mesh sieve), 100 to 200 c.f.m. of air per square foot of floor surface above A, 50 to 150 c.f.m. per square foot of floor surface in the intermediate floor area above B and 25 to 100 c.f.m. per square foot of floor above C will quickly discharge and pneumatically convey such finely divided material a distance of over 200 feet, and at no time will the pressure in the system exceed about 6 to 8 p.s.i. When coarser material is being conveyed and discharged, such as for example material of about 3 mesh, the volumetric flow rates in the various floor sections may be on the order of 135–270 c.f.m., 65–185 c.f.m. and 35–130 c.f.m. Coarser material, such as for example one composed of particles between ¼" and ½" in size will require even higher volumetric rates in order to fluidize, move the material in a virtually horizontal direction within the housing, and transport the material pneumatically an equivalent distance. Moreover, when very coarse lumpy material is being conveyed, higher velocities may be required and those can be obtained by reducing the diameter of the material conduit 10' but since each customer ordinarily receives materials of specific bulk density and particle size, the customer equips himself with a material conduit of required size. The rapidity with which material may be conveyed by this system is exemplified by noting that 200 c.f.m. of air will flow through a pipe of 4" internal diameter at a velocity of 2300 feet per minute, sufficient to transport 200 mesh material. When the material size is increased or the density of the material increases, higher velocities have to be used, e.g., ¼" mesh, 55 pounds per cubic foot requires about 5000 feet per minute whereas 200 mesh and 150 pounds per cubic foot employs about 7,000 feet per minute.

FIG. 4 diagrammatically illustrates the utilization of the equipment shown in FIG. 4 for the purpose of filling the transport 1 with granular material from storage 40. During such operation, valved inlet 43 is closed and air outlet 41 leading to dust colleector 42 is closed off as by valve 44, outlet 41 now being connected by conduit 22' through valve 23' to valved material outlet 20' located in the bottom of a central depression formed in a flat floor 3' of storage housing 40. This floor is provided with air distribution means in communication with an underlying air chamber, the air distribution means being arranged in concentric annular zones a', b', c', and cooperating with the air supply to the chamber so as to inject air at greater volumetric rate of flow into the material on floor section a' than in zones b' and c', in accordance with the mode of operation hereinbefore discussed. Air may be supplied to the sub-floor chamber by blower 9 and line 10'', a valved branch line also discharging into line 10' which receives granular material from the central well of storage 40 and valved material outlet 20'. Line 10' is used to conduct the granular material to transport housing 1, line 10' being connected to valved material inlet 27. Valve 26 is open to admit the material; valve 28 is open to permit air to discharge from housing 1 to the blower (or atmosphere) but all other valves to housing 1 (such as 12', 13', 14', 23 and 17) are closed while loading of transport housing 1 with material from storage 40 is taking place. From the description given previously herein, an operator can adjust the various valves to regulate the movement of air and material at volumetric rates and velocities pursuant to the method. When transport 1 is filled, the conduits or flexible hoses are disconnected therefrom, valves 26 and 28 are closed and the filled transport is ready to move to its destination.

FIGS. 5 and 6 relate to a modified form of railroad car embodying the present invention. In FIG. 5, the housing 1' is appreciably longer than that shown in FIG. 1 and is provided with a material discharge outlet 20 at a midpoint of the bottom portion of the housing. A fluidizing floor 3, which is substantially horizontal, extends from each end of the housing toward the central discharge outlet zone and a separate air chamber is provided beneath each of the floor sections 3. The same numerals have been used in FIG. 5 for the identification of the fluidizing air conduit 22, the air outlet 24, the filter screen 25, material inlet 27 and associated valves since they perform the same functions that they have performed in the form of apparatus shown in FIG. 1.

Each floor section above each of the unitary chambers at each end of the housing 1 is also shown divided into floor sections identified as 3a, 3b and 3c. Pursuant to the teachings of this invention, the air distribution means used in these three floor sections (at each end of the car) are of such character as to discharge air at greater rates of flow in sections 3a than in sections 3b and the sections 3b discharge air at a greater volumetric rate than in sections 3c adjacent the material outlet 20. As previously indicated, this can be accomplished, when the preferred form of air distribution means is employed, by making the jetting ports of the air distribution means of larger diameter in zone a than in zone b and that zone c has the smallest ports, or by using a greater number of distribution means in zone a than in b than in c.

Since but a single chamber exists below the floor carrying sections 3a, 3b and 3c, only a single air inlet is needed. For this reason, FIG. 5 shows the compressor 9 discharging air into conduit 10 and valved branch line 11 which now supplies air to the chamber underlying the left hand end of the housing 1' through line 19 and into the chamber beneath the right hand end of the car through line 19'. The main air discharge line 10 continues to beneath the material discharge outlet 20; just before reaching the material discharge outlet 20 the fluidizing air line 22 enters line 10 at an angle, and in the direction of flow of air therethrough so as to facilitate the movement of material which falls into line 10 to the valved material discharge line 20.

It may be noted that the various floor sections are not in exactly the same plane, floor section 3a being slightly higher than 3b and 3c. Although such slightly stepped arrangement is not essential to effective operation of the method of this invention, it has been found that some slight amount of material is left on the floor sections and the stepped arrangement facilitates final sweeping or cleaning of the contents of a tank into the discharge well. It may be noted that a manhole provided with a suitable tight fitting cover is provided on each of the housings so as to permit entry for the purpose of cleaning the filter 25 and sweeping or repairing the floor.

The air distribution means of the present invention may be used in modular form, that is, in the form of hollow, elongated chambers carrying a wall adapted to contact the granular material to be moved or fluidized, such wall portion being provided with the air distribution means. An end portion of one of such modular elements is illustrated in FIG. 7. The modular element 50 is an elongated hollow box-like element having an upper material contacting wall 51 provided with a plurality of spaced ports, in each of which a material distribution element 30 is fastened. The bottom wall section 52 is also provided with a port connected to a fitting adapted to be connected to an air supply conduit, such as 54. End walls such as 53 are provided. These modular elements may be placed in side by side or spaced relation along floors, sloping sides of bins, or the like, for the purpose of fluidizing the granular material contained therein and facilitating its movement. By the use of such modular elements, the unusual advantages attributable to the design of the air distribution means can be made available even in old pieces of equipment, storage tanks, hoppers and the like.

It is to be understood that the valves employed may be of any desired type adapted to handle the air, granular material and suspensions of material in air, and are preferably of quick acting type. Pressure gauges, sight glasses and various other devices useful in observing the operation may be installed. As previously indicated a great variety of finely divided, crushed, granular, prilled, crystalline or particulate organic and inorganic materials can be effectively handled. When the bulk weight per cubic foot, density and average particle size is taken into consideration, suitable volumetric rates of air supply, conduit sizes, velocities and settings of valve to feed material into the air stream can be readily determined in accordance with the guide lines hereinbefore referred to. In some instances the humidity and temperature of the air employed may be advantageously varied, particularly when deliquescent materials are handled.

All modifications coming within the appended claims are embraced thereby.

I claim:

1. In a housing for the transportation and storage of granular materials, said housing including a material-supporting floor section, a selectively operable material supply inlet into the top portion of the housing, and a material discharge outlet from the bottom portion of the housing, said material outlet including a selectively operable valve, the provision of:

an air supply chamber beneath at least a portion of the floor section, said chamber extending from adjacent the material discharge outlet to a zone distant therefrom;

means for supplying air to said chamber;

air conduit means, provided with an optionally operable valve, connecting the top of said housing with said material discharge outlet at a point downstream of the selectively operable valve therein, and air distribution means carried by the floor above said chamber, said air distribution means adapted to discharge air at a greater volumetric rate into the housing at zones distant from the material discharge outlet then in zones closer to said outlet.

2. In a housing as stated in claim 1, the provision of an air outlet provided with a selectively operable valve in communication with the upper portion of the housing interior at a point removed from the material supply inlet and connected to the means for supplying air to the chamber; and dust filter means separating said air outlet from the major portion of the interior of the housing.

3. In a housing for the transportation and storage of granular materials, said housing including a material-supporting floor section, a selectively operable material supply inlet into the top portion of the housing, and a material discharge outlet from the bottom portion of the housing, said material outlet including a selectively operable valve, the provision of:

an air supply chamber beneath at least a portion of the floor section, said chamber extending from adjacent the material discharge outlet to a zone distant therefrom;

means for supplying air to said chamber;

and air distribution means carried by the floor above said chamber, said air distribution means being adapted to discharge air at a greater volumetric rate into the housing at zones distant from the material discharge outlet than in zones closer to said outlet, the air distribution means comprising a multiplicity of upstanding hollow elements carried in spaced relation by the floor section above said chamber and in communication with the chamber, each element including a plurality of circumferentially spaced downwardly inclined jet ports of predetermined cross-sectional area.

4. In a housing as stated in claim 3, the provision of air distribution means comprising a multiplicity of upstanding hollow elements carried in spaced relation by the floor section above said chamber and in communication with the chamber, each element including a plurality of circumferentially spaced, downwardly inclined jet ports of virtually equal area, the number of said air distribution means per unit floor area being greater in zones distant from the material discharge outlet than in zones closer to said outlet.

5. In a housing as stated in claim 3, the provision of air distribution means comprising a multiplicity of upstanding hollow elements carried in spaced relation by the floor section above said chamber and in communication with the chamber, each element including a plurality of circumferentially spaced, downwardly inclined jet ports, the jet ports of distribution means in zones removed from the material discharge outlet being of greater cross-sectional area than the area of jet ports of such means in zones closer to said outlet.

6. In a housing for the transportation and storage of granular materials, said housing including a material supporting floor section, a selectively operable material supply inlet into the top portion of the housing, and a material discharge outlet from the bottom portion of the housing, said material outlet including a selectively operable valve, the provision of:

a plurality of successive adjacent air supply chambers beneath said floor section, said chambers extending from adjacent the material discharge outlet to a zone distant therefrom:

air distribution means carried by said floor section above each of said chambers said air distribution means comprising a multiplicity of upstanding hollow elements carried in spaced relation by the floor section above said chambers and in communication with the chambers, each element including a plurality of circumferentially spaced downwardly inclined jet ports;

a means for supplying air to each of said chambers, said air supply means and said air distribution means cooperating to discharge air into the housing at a greater volumetric rate at zones further removed from the material discharge outlet than in zones closer to said outlet.

7. Apparatus for effectively fluidizing granular material comprising:

a hollow chamber including a wall portion adapted to contact granular material to be fluidized;

means for supplying air to said hollow chamber;

a plurality of upstanding hollow air distribution elements carried in spaced relation by said wall portion and in communication with said chamber, each element including a plurality of jet ports inclined downwardly toward said wall portion, said jet ports being of predetermined cross-sectional area.

8. In a housing for the transportation and storage of granular materials, said housing including a material-supporting floor section, a selectively operable material supply inlet into the top portion of the housing, and a material discharge outlet from the bottom portion of the housing, said material outlet including a selectively operable valve, the provision of:

an air supply chamber beneath at least a portion of the floor section, said chamber extending from adjacent the material discharge outlet to a zone distant therefrom;

means for supplying air to said chamber;

and air distribution means carried by the floor above said chamber, said air distribution means being adapted to discharge air at a greater volumetric rate into the housing at zones distant from the material discharge outlet than in zones closer to said outlet, the air distribution means comprising a multiplicity of spaced orifices in the floor-section above said chamber and in communication with the chamber, a greater number of orifices being located at zones distant from material discharge outlet than in zones closer to said outlet.

9. In a housing according to claim 8 the provision of a plurality of successive adjacent air supply chambers beneath said floor section, said chambers extending from adjacent the material discharge outlet to a zone distant therefrom, and means for supplying air to each of said chambers, the air supply means and the air distribution means cooperating to discharge air into the housing at a greater volumetric rate at zones further removed from the material discharge outlet than in zones closer to said outlet.

10. In a housing for the transportation and storage of granular materials, said housing including a material supply inlet into the top portion of the housing, and a material discharge outlet from the bottom portion of the housing, said material outlet including a selectively operable valve, the provision of:

an air supply chamber beneath at least a portion of the floor section, said chamber extending from adjacent the material discharge outlet to a zone distant therefrom;

means for supplying air to said chamber;

and air distribution means carried by the floor above said chamber, said air distribution means being adapted to discharge air at a greater volumetric rate into the housing at zones distant from the material discharge outlet than in zones closer to said outlet, the air distribution means comprising a multiplicity of spaced orifices carried by the floor section above said chamber and in communication with the chamber, the orifices located at zones distant from the material discharge outlet having a greater diameter than the orifices located in zones closer to said outlet.

11. In a housing as stated in claim 10 the provision of a plurality of successive adjacent air supply chambers beneath said floor section, said chambers extending from adjacent the material discharge outlet to a zone distant therefrom, the air supply means and the air distribution means cooperating to discharge air into the housing at a greater volumetric rate at zones further removed from the material discharge outlet than in zones closer to said outlet.

References Cited
UNITED STATES PATENTS

| | | | |
|---|---|---|---|
| 1,971,853 | 8/1934 | Ihlefeldt | 302—29 |
| 2,589,968 | 3/1952 | Schemm | 214—83.28 |
| 3,223,457 | 12/1965 | Albert | 302—53 |

ANDRES H. NIELSEN, *Primary Examiner.*